United States Patent
Davis et al.

(10) Patent No.: US 8,720,607 B2
(45) Date of Patent: May 13, 2014

(54) DOWNHOLE TOOL HAVING A FRICTION STIRRED SURFACE REGION

(75) Inventors: Richard Davis, Houston, TX (US); Brian W. Cruickshank, Montgomery, TX (US)

(73) Assignee: Smith International, Inc., Houston, TX (US)

( * ) Notice: Subject to any disclaimer, the term of this patent is extended or adjusted under 35 U.S.C. 154(b) by 224 days.

(21) Appl. No.: 13/076,808

(22) Filed: Mar. 31, 2011

(65) Prior Publication Data
US 2011/0240374 A1 Oct. 6, 2011

Related U.S. Application Data
(60) Provisional application No. 61/319,859, filed on Mar. 31, 2010.

(51) Int. Cl.
*E21B 7/28* (2006.01)
(52) U.S. Cl.
USPC ........... 175/284; 228/112.1; 148/714; 175/57
(58) Field of Classification Search
USPC .................. 228/112.1; 148/714; 175/284, 57
See application file for complete search history.

(56) References Cited

U.S. PATENT DOCUMENTS

| | | | |
|---|---|---|---|
| 3,060,588 A | 10/1962 | Lanmon et al. | |
| 3,680,208 A | 8/1972 | Bohne et al. | |
| 4,256,518 A | 3/1981 | Bolton et al. | |
| 4,613,839 A | 9/1986 | Foglesonger et al. | |
| 4,648,546 A | 3/1987 | Gellert | |
| 4,665,996 A | 5/1987 | Foroulis et al. | |
| 5,244,559 A | 9/1993 | Latz | |
| 5,460,317 A | 10/1995 | Thomas et al. | |
| 6,019,628 A | 2/2000 | Shinchi | |
| 6,045,028 A | 4/2000 | Martin et al. | |
| 6,309,762 B1 | 10/2001 | Speckert | |
| 6,375,865 B1 | 4/2002 | Paulson et al. | |
| 6,375,895 B1 | 4/2002 | Daemen | |
| 6,450,395 B1 | 9/2002 | Weeks et al. | |

(Continued)

FOREIGN PATENT DOCUMENTS
| | | |
|---|---|---|
| EP | 1690627 A2 | 8/2006 |
| JP | 11-20432 | 1/1999 |

(Continued)

OTHER PUBLICATIONS
International Search Report and Written Opinion dated Nov. 25, 2011 for corresponding PCT Application No. PCT/US2011/030679 filed Mar. 31, 2011.

(Continued)

*Primary Examiner* — Yong-Suk (Philip) Ro

(57) ABSTRACT

A method for hardening a portion of the outer surface of a downhole tool body includes friction stirring the vulnerable surface of the tool. Such friction stirring generally includes rotating a friction stir weld tool in contact with the surface until a portion of the tool penetrates the tool. The friction stir weld tool is then translated (while rotating) across a predetermined region of the surface thereby creating a friction stir zone. The friction stir zone is generally considerably harder, and therefore more wear resistant, than the parent material that makes up the tool body. The resulting downhole tool includes at least one surface with a hard friction stir zone.

17 Claims, 6 Drawing Sheets

(56) References Cited

U.S. PATENT DOCUMENTS

| | | |
|---|---|---|
| 6,601,475 B2 | 8/2003 | Davies et al. |
| 6,648,206 B2 | 11/2003 | Nelson et al. |
| 6,670,880 B1 | 12/2003 | Hall et al. |
| 6,732,817 B2 | 5/2004 | Dewey et al. |
| 6,861,612 B2 | 3/2005 | Bolton et al. |
| 7,105,205 B2 | 9/2006 | Clayton et al. |
| 7,124,929 B2 | 10/2006 | Nelson et al. |
| 7,240,821 B2 | 7/2007 | Talwar |
| 7,270,257 B2 | 9/2007 | Steel et al. |
| 7,361,411 B2 | 4/2008 | Daemen et al. |
| 8,186,561 B2 | 5/2012 | Allen et al. |
| 2002/0054972 A1 | 5/2002 | Charpentier et al. |
| 2002/0108740 A1 | 8/2002 | Hidaka et al. |
| 2002/0153130 A1 | 10/2002 | Okamoto et al. |
| 2002/0179673 A1 | 12/2002 | Strombeck et al. |
| 2002/0190100 A1 | 12/2002 | Duncan et al. |
| 2005/0082342 A1 | 4/2005 | Babb et al. |
| 2005/0139640 A1 | 6/2005 | Kay |
| 2006/0049234 A1* | 3/2006 | Flak et al. .................. 228/112.1 |
| 2006/0086707 A1 | 4/2006 | Kou et al. |
| 2006/0102354 A1 | 5/2006 | Gammage et al. |
| 2006/0225926 A1 | 10/2006 | Madhavan et al. |
| 2006/0255094 A1 | 11/2006 | Taylor et al. |
| 2006/0260797 A1 | 11/2006 | Hall et al. |
| 2006/0260798 A1 | 11/2006 | Hall et al. |
| 2007/0159351 A1 | 7/2007 | Madhavan et al. |
| 2007/0261226 A1 | 11/2007 | Deul et al. |
| 2008/0000945 A1 | 1/2008 | Hidaka et al. |
| 2008/0106433 A1 | 5/2008 | Madhavan et al. |
| 2008/0115971 A1 | 5/2008 | Kelleher et al. |
| 2008/0230155 A1 | 9/2008 | Lai et al. |
| 2010/0038407 A1 | 2/2010 | Keshavan et al. |
| 2010/0038408 A1 | 2/2010 | Keshavan et al. |
| 2010/0071961 A1 | 3/2010 | Steel et al. |
| 2010/0078224 A1 | 4/2010 | Steel et al. |
| 2010/0264646 A1 | 10/2010 | Follini |
| 2011/0017334 A1 | 1/2011 | Peter et al. |
| 2011/0079446 A1 | 4/2011 | Oxford |
| 2011/0240372 A1 | 10/2011 | Davis |
| 2012/0273555 A1 | 11/2012 | Flak et al. |

FOREIGN PATENT DOCUMENTS

| | | |
|---|---|---|
| JP | 2004034140 A | 2/2004 |
| JP | 2004-263568 | 9/2004 |
| JP | 2007237258 A | 9/2007 |
| KR | 1020010087185 A | 9/2001 |
| KR | 10-0762940 | 10/2007 |

OTHER PUBLICATIONS

J.G. Mobley, et al. A metallurgical approach to the design of hardbanding alloys; World Oil.com, The oilfield information source, vol. 229, No. 1, Jan. 2008 (9 pages).

J. Truhan, et al. Wear and friction of hard-faced claddings; Block-on-ring test configuration shows that cladding microstructure in new developmental alloys effects both cladding and casing wear; World Oil.com, The oilfield information source, vol. 229, No. 3, Mar. 2008 (8 pages).

S. Eickhoff, Titanium-based hardbanding aims to balance protection for wear in casing, tool joints; Downhole Tools, Drilling Contractor, Mar./Apr. 2007 (2 pages).

Joe Haberer, Viable drill pipe hardbanding strategies are outlined, Drilling Contractor, Nov./Dec. 2000 (2 pages).

Joyce Berger, et al. The NanoSteel Company Pioneers Downhole Solution for Grant Prideco, Resulting in Revolutionary New Tool Joint Hardbanding Material, The Nanosteel News Release, Jun. 2005 (2 pages).

J.G. Mobley, Hardbanding and Its Role in Directional/Horizontal Drilling, SPE 52187 Society of Petroleum Engineers, Mar. 1999 (3 pages).

* cited by examiner

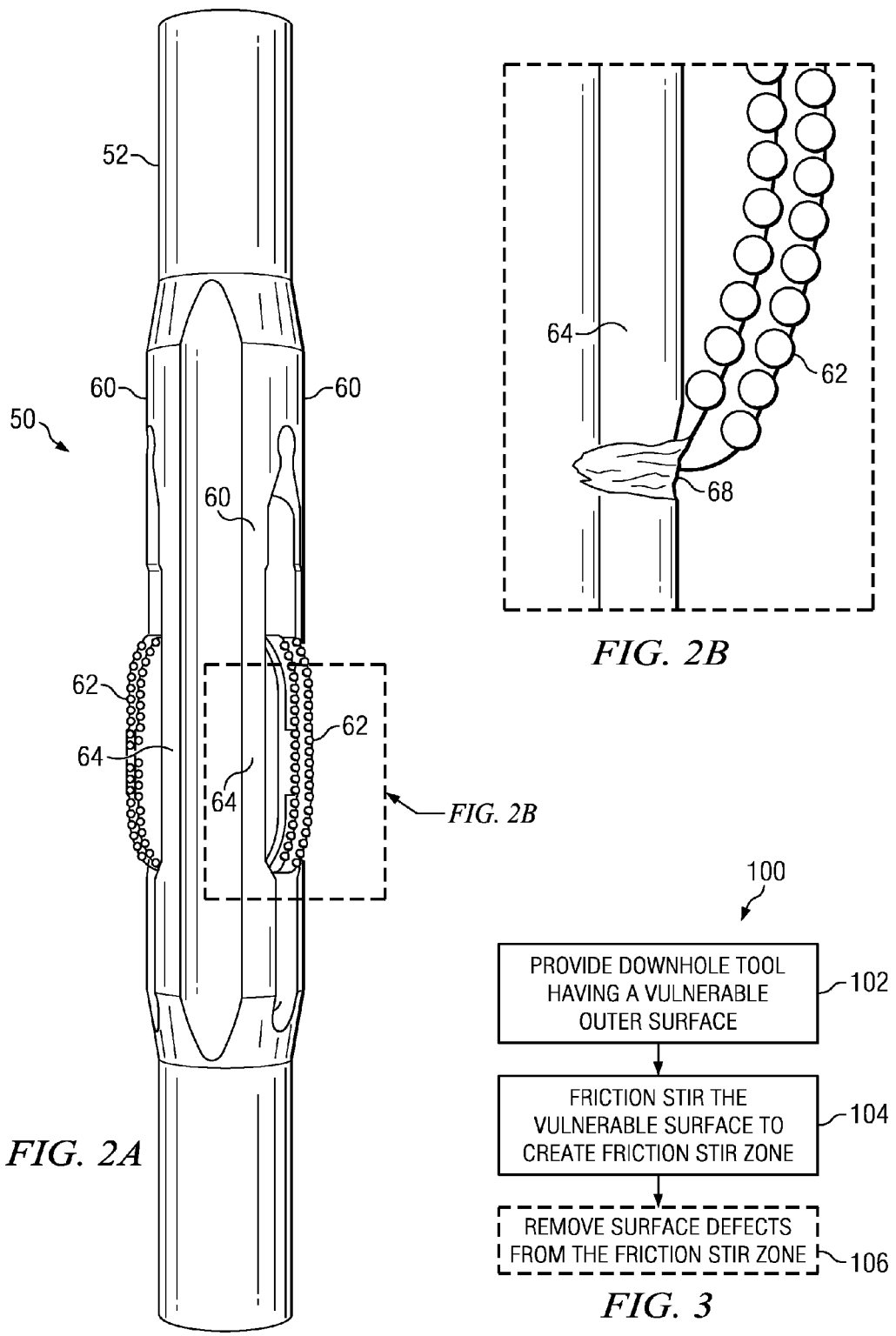

DOWNHOLE TOOL HAVING A FRICTION STIRRED SURFACE REGION

RELATED APPLICATIONS

This application claims the benefit of U.S. Provisional Application Ser. No. 61/319,859 entitled Friction Stirring of Downhole Tools to prevent Mud Ringing, filed Mar. 31, 2010

FIELD OF THE INVENTION

The present invention relates generally to downhole tools. More particularly, the invention relates to a method for treating an outer surface of a downhole tool using friction stirring to improve the abrasion resistance of the tool. The invention further relates to a downhole tool including a friction stirred outer surface.

BACKGROUND OF THE INVENTION

A wide variety of downhole tools are used in conventional subterranean drilling operations. Such tools include, for example, drill bits, enlargement tools such as hole openers and underreamers, rotary steerable tools, measurement and logging while drilling tools, drilling motors, and stabilizers. Some such tools, for example, including certain expandable reamers, have a complex outer geometry that can create dead flow zones during drilling. Cuttings in the upwardly travelling annular column of drilling fluid can build up on the outer surface of the downhole tool at these dead zones. The presence of the cuttings can then lead to excessive abrasion and even scoring of the tool body during drilling. This phenomenon is sometimes referred to in the art as "mud ringing". The scoring in the tool body can be so significant that the outer body of the tool must be scrapped in order to prevent crack propagation and premature or even catastrophic tool failure in service.

Various attempts have been made to solve this problem. For example, fluid flow can be diverted from the central bore of the tool to the annular column via placing one or more nozzles along the length of the affected tool. While these nozzles tend to eliminate the dead zones by creating additional hydraulic flow around the tool, they are not without drawbacks. In particular, such a diversion of the drilling fluid reduces pressure at the drill bit, which can in turn reduce penetration rates. In operations that make use of a drilling motor, diverting drilling fluid also reduces the pressure in the motor, which again tends to reduce penetration rates.

Attempts have also been made to apply various wear resistant coatings to the susceptible areas of the outer tool surface. However, the application of these coatings can introduce other difficulties. For example, such wear resistant coatings can be costly and difficult to adhere to the tool body. These coatings are known to flake off during service which can result in rapid erosion of the parent metal. The application of a sufficient thickness of coating material also tends to change the geometry of the tool body. Such changes are commonly unacceptable and thus create the need for the removal of parent metal from the tool body, which can in turn compromise tool strength.

Hardbanding techniques have also been utilized (e.g., in lieu of wear resistant coatings). In one such technique, a hardbanding material (e.g., tungsten carbide particulate) is deposited in a weld puddle formed on the surface of the tool. While the use of these techniques can improve wear resistance, they also can increase the susceptibility of the tool to cracking in the weld zone. Such a susceptibility to cracking tends to limit the use of heart banding techniques in downhole applications.

Therefore a need exists for a downhole tool body that resists mud ringing without the need to apply a wear resistant coating or to divert drilling fluid. There also exists a need for a method for increasing the wear resistance of an outer surface on a downhole tool so as to reduce scoring and ringing caused by caking of mud and cuttings during drilling operations.

SUMMARY OF THE INVENTION

The present invention addresses one or more of the above-described drawbacks of the prior art. One aspect of the invention includes a method for hardening a portion of the outer surface of a downhole tool body. The method includes friction stirring the vulnerable surface of the tool. Such friction stirring generally includes rotating a friction stir weld tool in contact with the surface until a portion of the tool penetrates the tool. The friction stir weld tool is then translated (while rotating) across a predetermined region of the surface thereby creating a friction stir zone. The friction stir zone is generally considerably harder, and therefore more wear resistant, than the parent material that makes up the tool body. The invention also includes certain downhole tool embodiments having at least one surface with a hard friction stir zone.

Exemplary embodiments of the present invention advantageously provide several technical advantages. For example, friction stirring has been advantageously found to significantly increase the hardness and wear and abrasion resistance of the stirred region. The friction stir zone also tends to resist cracked initiation and propagation during service. Moreover, friction stir welding is a generally simple and inexpensive process to implement as compared to the application of wear resistant coatings. Friction stirring can also generally be utilized on preexisting tools without the need for redesigning the tool.

In one aspect the present invention includes a method for improving the hardness of an outer surface of a downhole tool body. A downhole tool body being configured for coupling with a drill string and further including an outer surface having first and second regions is provided. The first region of the outer surface of the tool body is friction stirred to create a friction stir zone. The friction stir zone has a hardness that is greater than a hardness of the second region of the downhole tool body.

In another aspect, the present invention includes a downhole tool for use in a downhole drilling assembly. The tool comprising includes a downhole tool body configured for coupling with a drill string. The tool body includes an axial through bore and an outer surface including at least first and second regions. The first region of the outer surface includes a friction stir zone having (i) a hardness greater than a hardness of the second region and (ii) a grain size less than one-half a grain size of the second region.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A, 2B and 2C (collectively FIG. 2) depict a prior art underreamer upon which exemplary method embodiments of the present invention may be utilized.

FIG. 3 depicts a flow chart of one exemplary method embodiment in accordance with the present invention.

DETAILED DESCRIPTION

Figure 1:
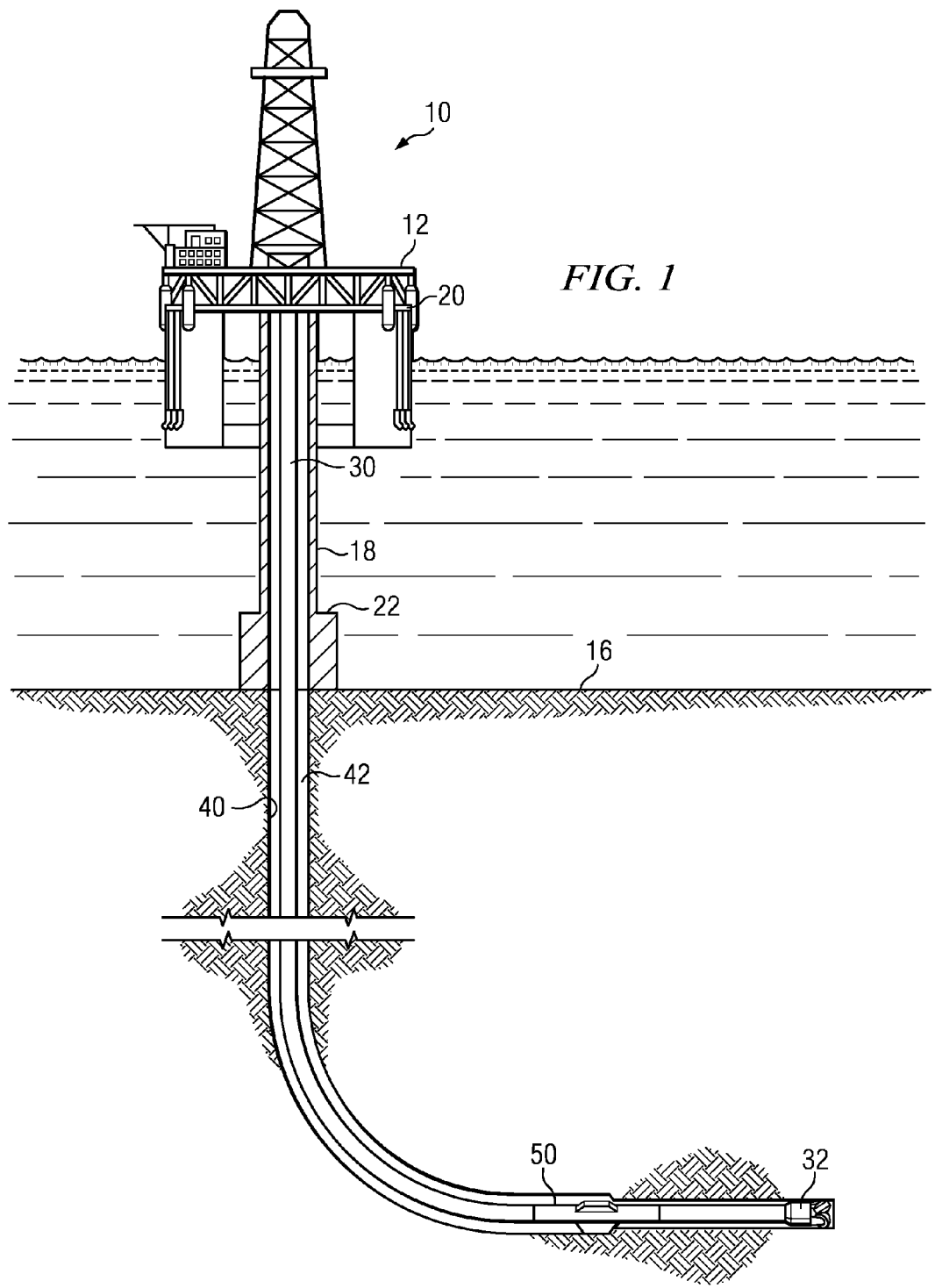
FIG. 1 depicts a conventional drilling rig on which exemplary downhole tools fabricated in accordance with the present invention may be utilized.

FIG. 1 depicts an exemplary offshore drilling assembly, generally denoted 10, suitable for deploying exemplary downhole tool embodiments in accordance with the present invention. In FIG. 1 a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes drill bit 32 and an underreamer 50 deployed above the bit. Drill string 30 may optionally further include substantially any number of other downhole tools including, for example, measurement while drilling or logging while drilling tools, stabilizers, a drilling jar, a rotary steerable tool, and a downhole drilling motor.

During a typical drilling operation, drilling fluid (commonly referred to as "mud" in the art) is pumped downward through the drill string 30 and the bottom hole assembly (BHA) where it emerges at or near the drill bit 32 at the bottom of the borehole 40. The mud serves several purposes, including cooling and lubricating the drill bit, clearing cuttings away from the drill bit and transporting them to the surface, and stabilizing and sealing the formation(s) through which the borehole traverses. The discharged mud, along with the borehole cuttings and sometimes other borehole fluids, then flow upwards through the annulus 42 (the space between the drill string 30 and the borehole wall) to the surface. As described above in the Background Section, the upward flow of drilling fluid can become restricted in certain annular regions, for example, between a fixed blade structure 60 (FIG. 2A) of underreamer 50 and the borehole wall. A buildup of cuttings in these restricted regions (dead zones) can lead to excessive abrasion and scoring of the tool body.

It will be understood by those of ordinary skill in the art that the deployment illustrated on FIG. 1 is merely exemplary. It will be further understood that exemplary embodiments in accordance with the present invention are not limited to use with a semisubmersible platform 12 as illustrated on FIG. 1. The invention is equally well suited for use with any kind of subterranean drilling operation, either offshore or onshore.

FIGS. 2A and 2B depict one example of mud ringing on a Rhino® underreamer tool. The overall function and design of the Rhino® tool is described in more detail in U.S. Pat. No. 6,732,817, which is fully incorporated by reference herein. A perspective view of the tool 50, which is sold by the assignee of the present application, is depicted on FIG. 2A. The tool includes a generally cylindrical external tool body 52 having a plurality of fixed blades 60 that extend radially outward from the tool body. Each of the blades includes a radially extendable/retractable cutting structure 62 deployed therein which is configured for cutting the borehole wall so as to increase the borehole diameter (e.g., as depicted on FIG. 1).

Figure 2C:
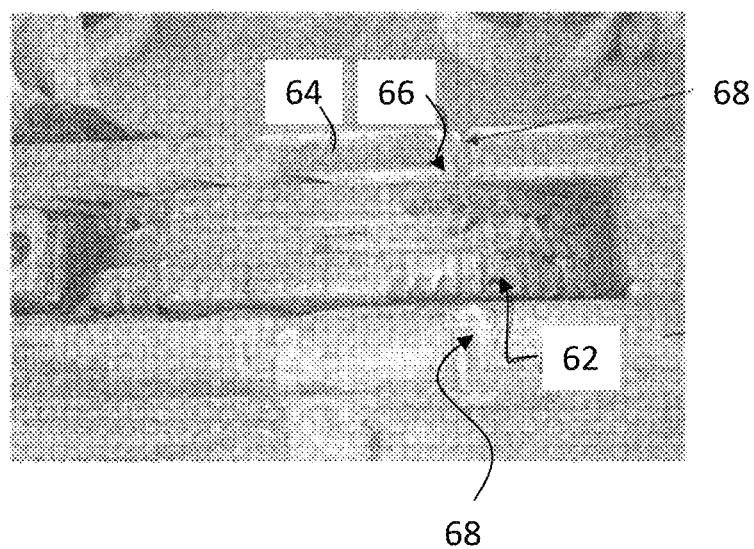

FIG. 2B depicts an expanded view of one of the fixed blades. A mud ring 68 is shown worn into an outer surface 64 of the tool body (depicted as 52 in FIG. 1) along the side of the blade (specifically adjacent opening 66 that receives expandable/retractable cutting structure 62 deployed therein shown in FIG. 2C). As described above, the mud ring 68 is believed to be caused by a buildup for cuttings that collect in a static flow area around the tool in certain drilling applications. In the particular embodiment depicted, the mud ringing occurs on a radially outward facing surface of the tool body as well as on the outwardly facing surface of the blade (i.e., the side of the blade facing the borehole wall). This surface of the tool is sometimes referred to as the mud ringing zone. Generally, the surface of the tool that includes the mud ringing zone is at an outermost radial extent of the tool body. However, it will be understood that the invention is not limited in this regard as the location of mud ringing can vary based on the particular tool type and the drilling application.

Exemplary embodiments of the present invention are intended to improve the hardness, and therefore the wear and abrasion resistance, of vulnerable downhole tool surfaces (e.g., a mud ringing zone or a contact zone which routinely contacts the borehole wall). Exemplary method embodiments in accordance with the present invention include at least one step in which a vulnerable tool surface is friction stirred so as to increase the hardness of the surface. Exemplary tool embodiments in accordance with the present invention include at least one hardened outer surface having a friction stir zone.

Certain embodiments of the invention are described below with respect to an underreamer (e.g. as depicted on FIG. 2). It will be understood that the invention is explicitly not limited to such underreamer embodiments. The invention is potentially applicable to substantially any downhole tool having an outer surface that is vulnerable to abrasion and wear. For example, methods in accordance with the present invention may be advantageously applied to underreamers, hole openers, drilling jars, stabilizers, and rotary steerable tools employing blades.

Those of ordinary skill in the art will readily appreciate that hole openers and underreamers are commonly utilized during drilling in borehole enlargement operations. While the invention is by no means limited by such terminology, the term "hole opener" as used in the industry commonly refers to a cutting structure having fixed cutting blades while the term "underreamer" commonly refers to a cutting structure having extendable and retractable cutting blades. Drilling jars (both mechanically and hydraulically actuated) are commonly utilized to dislodge a drill string that is stuck in the borehole. Mud ringing is commonly observed in drilling jars as the outer surface of the tool is typically in close proximity to the borehole wall. Stabilizers and rotary steerable tools commonly employ blades that continuously contact the borehole wall during drilling. These blades tend to be highly susceptible to wear and abrasion.

FIG. 3 depicts a flow chart of one exemplary method embodiment 100 in accordance with the present invention. A downhole tool body is provided at 102 (e.g., tool body 52 shown on FIGS. 2A and 2B). The tool body includes a vulnerable outer surface as described above (e.g., a mud ringing zone). The vulnerable outer surface is then friction stirred at 104 to create a friction stir zone. Suitable friction stirring processes for ferrous materials (e.g., plain carbon steels, stainless steels, high-strength steels, and the like) are described in more detail in U.S. Pat. No. 6,648,206, which is fully incorporated herein by reference. Friction stir welding services may be provided, for example, by MegaStir® Technologies in Provo, Utah. Friction stirring (or friction stir welding) processes sometimes leave metal flashing, debris, or other surface defects in the outer surface of the tool. These may be optionally removed, for example, via one or more post-processing surface polishing, grinding, and/or machining steps at 106. However, the invention is not limited in regards to any post-processing steps.

Figure 4A:
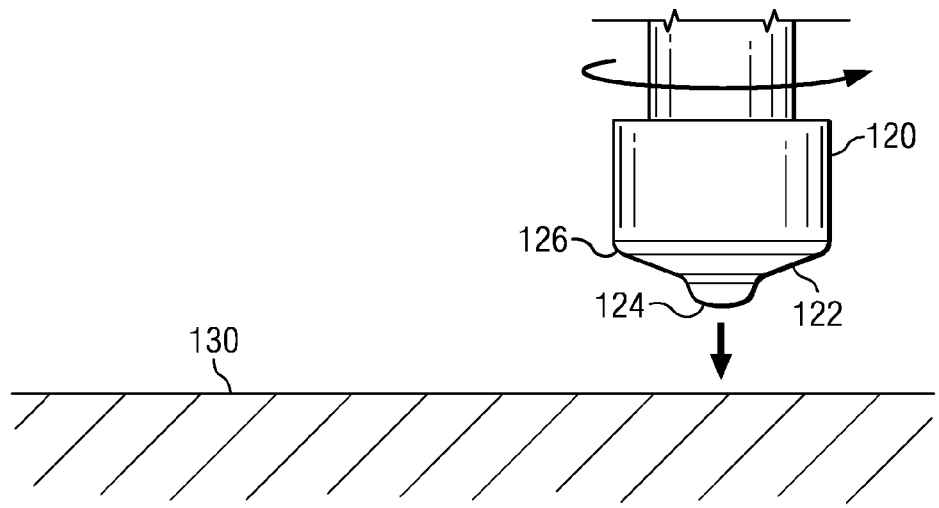
FIGS. 4A, 4B, and 4C (collectively FIG. 4) depict a friction stirring process suitable for use with the method embodiment depicted on FIG. 3.
Figure 4B:
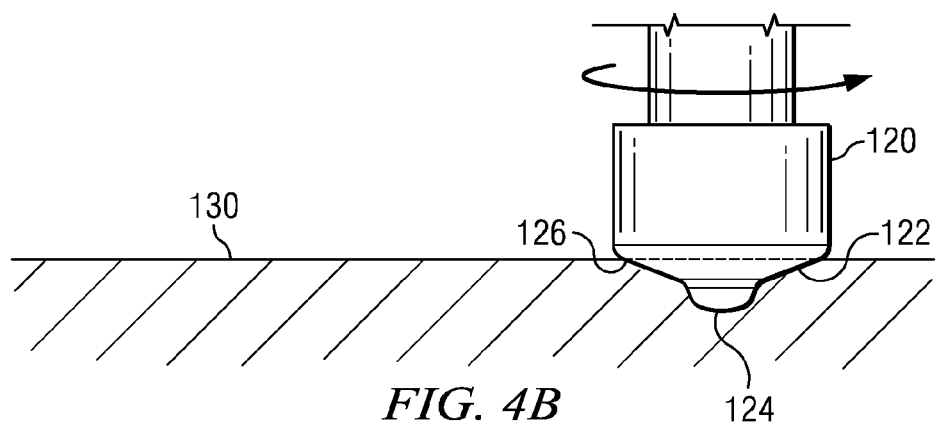
Figure 4C:
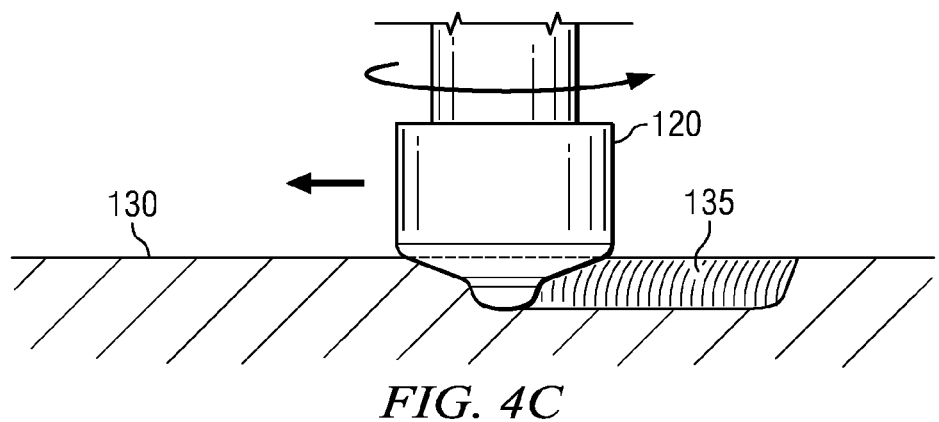

FIGS. 4A through 4C depict one exemplary embodiment of a suitable friction stirring process. In FIG. 4A a friction stir welding (FSW) tool is rotated in proximity to the work piece 130 (i.e., the vulnerable surface on the tool body). The depicted FSW tool includes a substantially cylindrical head 120 having an engagement face 122 which in turn has a central pin 124 and an outer shoulder 126. The engagement face 122 is configured to engage the work piece 130 and is preferably coated with a layer of superabrasive such as polycrystalline boron nitride. The rotating FSW tool is moved (e.g., lowered) into contact with the work piece, which causes a localized heating of the tool body such that the pin 124 and sometimes a portion of the lower face 122 plunges into the work piece 130 while rotating (as depicted on FIG. 4B). It will be understood that rotation of the FSW tool can commence either before or after contact is made with the work piece. The FSW tool is then translated (while continuing to rotate) across the work piece (e.g., the mud ringing zone) leaving behind a friction stir zone 135 (FIG. 4C). Substantially any desired area may be friction stirred in one or more passes until the desired area has been stirred. The FSW tool may be removed from the work piece after completion of the friction stirring process (or between individual passes).

Figure 5:
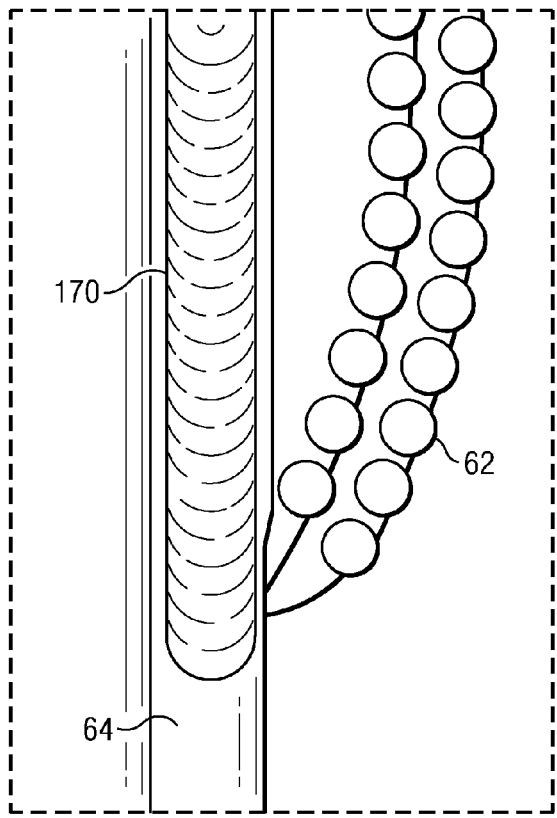
FIG. 5 depicts a friction stir zone on an outer surface of a downhole tool.

FIG. 5 depicts one exemplary embodiment of the invention in which the mud ringing zone of the aforementioned Rhino® reamer tool (discussed above with reference to FIGS. 2A-2C) has been friction stirred in accordance with method 100. In the exemplary embodiment depicted, a friction stir area has been creating using a single pass of a friction stir welding tool (e.g., as depicted on FIG. 4). In the exemplary embodiment depicted, such friction stirring has been found to significantly increase the hardness (and therefore the wear and abrasion resistance) of the tool body outer surface 64 in the friction stir area. In one exemplary underreamer embodiment, the tool body is fabricated from AISI 4000 series alloy steel (these alloys are sometimes referred to in the art as high strength steels). Hardness measurements were made on the tool body in the friction stir zone and away from the friction stir zone. The hardness data depicted in Table 1 indicate that friction stirring a downhole tool tends to significantly increase its hardness.

TABLE 1

Friction Stir Zone Hardness

| Measurement Type | Tool Body AISI 4000 Series Alloy Steel | Friction Stir Zone |
|---|---|---|
| Rockwell C | 21 | 60 |
| Vickers | 238 | 681 |
| Brinnel | 329 | 561 |

In preferred embodiments of the invention the friction stir weld zone has a hardness greater than that of the tool body parent material by at least 10 points (and more preferably 20 points) on the Rockwell C harness scale and at least 100 points (and more preferably 200 points) on the Vickers and Brinnel hardness scales.

While not wishing to be bound by theory, it is believed that the friction stirring process work hardens the friction stir area (thereby increasing the hardness). It will be understood that friction stirring is a solid-state process that imparts significant plastic deformation into the work piece. Therefore, by work hardens it is meant that the friction stirring process plastically deforms the friction stir area thereby typically decreasing the grain size and increasing the dislocation density of the material. Optical microscopy analysis of the tool body in the vicinity of the friction stir zone indicates that the friction stir zone has a grain size that is less than one-half that of the parent material. It is believed that the smaller grain size of the friction stir zone is at least partially responsible for the increased hardness.

With further reference to FIG. 5, the friction stir area may include metal flashing, debris, and/or other imperfections (not shown). These may be optionally removed, for example, via the surface polishing, grinding, and/or machining steps described above with respect to FIG. 3. Such surface processing is not typically necessary from a wear or abrasion resistance standpoint, but may be desirable, for example, for aesthetic reasons.

Figure 6A:
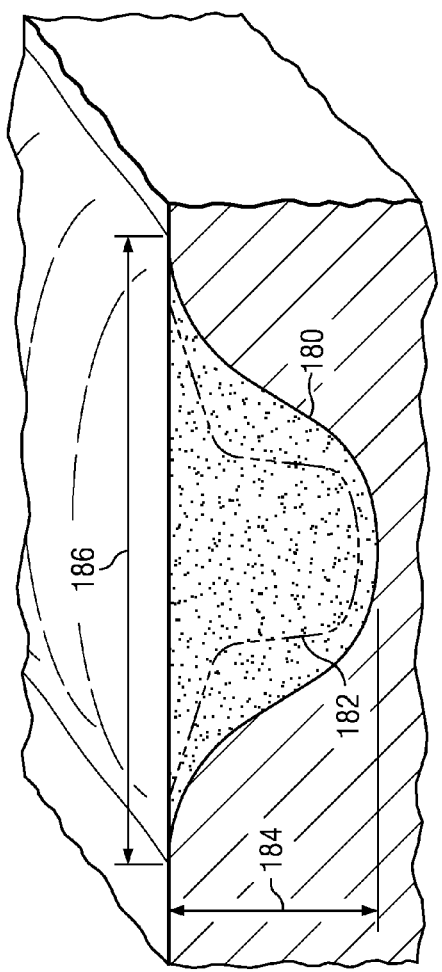
FIGS. 6A and 6B depict cross sections of exemplary friction stir zones formed in accordance with the present invention.
Figure 6B:
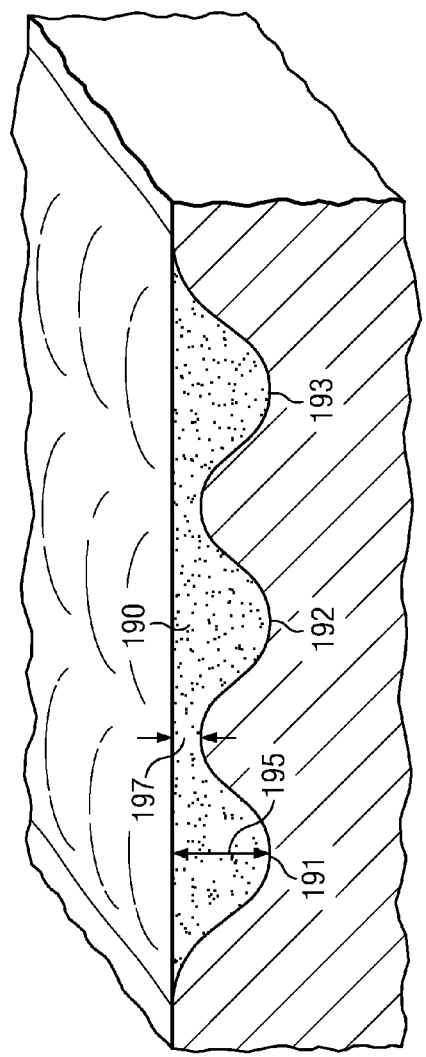

FIGS. 6A and 6B depict exemplary friction stir zones in cross-section. In FIG. 6A friction stir zone 180 is formed by a single pass of a FSW tool (e.g., as depicted on FIG. 5). The resulting friction stir zone is generally trough shaped in cross-section (as indicated). FIG. 6A also indicates (dotted line at 182) the former location of the FSW head during the formation of the friction stir zone 180. As indicated, the trough depth 184 and width 186 are typically somewhat greater than the corresponding pin penetration depth and width. While the invention is not limited to any particular trough depths, it has been found that a trough depth in the range from about 0.05 to about 0.25 inches is preferred. In general a thicker friction stir weld zone is preferable from the standpoint of wear and abrasion resistance. However, increasing the zone thickness also tends to increase manufacturing difficulties as it requires increased forces during the friction stirring process. Depths in the range from about 0.05 to about 0.25 inches tend to provide a suitable balance between the need for increased wear and abrasion resistance the desire to minimize the required forces during manufacturing.

FIG. 6B depicts a friction stir zone 190 that is formed by three partially overlapping passes 191, 192, and 193 of a FSW tool. Multiple passes of the FSW tool enable a friction stir zone of considerable width to be formed (without having to use a weld head of comparable width). For example, the entire outer surface of a cylindrical downhole tool may be friction stirred by making multiple partially overlapping axial or circumferential passes with a suitable FSW tool. Each pass of the FSW tool results in friction stir zone that is generally trough shaped in cross-section (as indicated). In the exemplary embodiment depicted, the partially overlapping passes result in a friction stir zone having a variable thickness (the thickness of the zone is maximum 195 at the approximate center of each pass and decreases monotonically to a minimum 197 between passes. While the invention is not limited in this regard, the maximum and minimum thicknesses are preferably both in the range from about 0.05 to about 0.25 inches for the reasons discussed above with respect to FIG. 6A.

Figure 7:
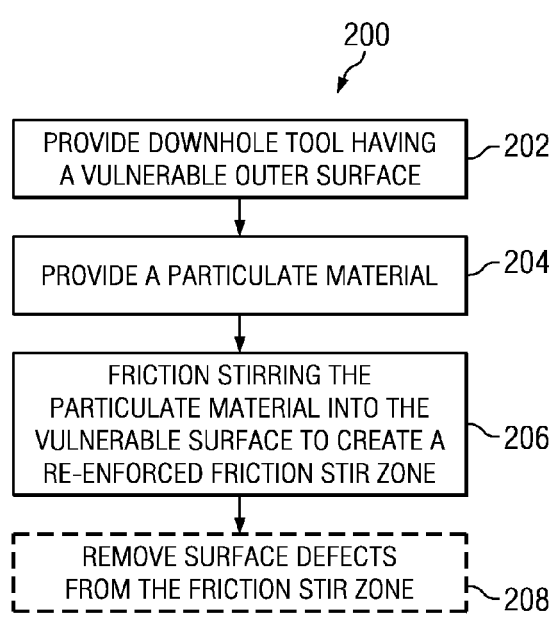
FIG. 7 depicts a flow chart of an alternative method embodiment in accordance with the present invention.

FIG. 7 depicts an alternative method embodiment 200 in accordance with the present invention. At 202 a downhole tool body including a vulnerable outer surface is provided. At 204 a particulate material is provided. The particulate material may include, for example, D2 plain carbon powdered steel, a carbide powder or fiber, a nitride powder or fiber, a super abrasive powder or fiber, and/or a diamond powder or fiber. At 206 the particulate material is friction stirred into the vulnerable outer surface of the downhole tool body to create a reinforced friction stir zone. This may be accomplished, for example, by distributing (or adhering) the particulate material over the vulnerable outer surface prior to engaging the surface with the FSW tool. The particulate material tends to further reinforce the friction stir zone and may therefore further enhance the mechanical properties thereof (e.g., the hardness or toughness of the zone). Various surface defects may also be optionally removed at 208 after the friction stirring step as described above.

Although the present invention and its advantages have been described in detail, it should be understood that various changes, substitutions and alternations can be made herein without departing from the spirit and scope of the invention as defined by the appended claims.

We claim:

1. A method for improving the hardness of an outer surface of an expandable reamer body, the method comprising:
    (a) providing the expandable reamer, the expandable reamer being configured for coupling with a drill string and including a tubular body having a first region and a second region, wherein the first region defines an opening in the outer surface configured to receive an expandable and retractable cutting structure; and
    (b) friction stirring the tubular body of the expandable reamer in the first region to create a friction stir zone, the friction stir zone extending substantially the same as a length of the opening in the outer surface configured to receive the expandable and retractable cutting structure to create a friction stir zone, the friction stir zone having a hardness that is greater than a hardness of the second region of the tubular body.

2. The method of claim 1, further comprising:
    friction stirring at least a portion of an outer surface of the expandable and retractable cutting structure.

3. The method of claim 1, further comprising:
    (c) post-processing the friction stir zone to reduce surface defectivity, the post-processing including polishing, grinding, or machining the friction stir zone.

4. The method of claim 1, wherein (b) further comprises:
    (i) rotating a friction stir weld head in contact with the first region of the tubular body until a portion of the head penetrates the surface; and
    (ii) translating the rotating friction stir weld head across a predetermined area of the first region so as to create the friction stir zone.

5. The method of claim 4, wherein (ii) further comprises translating the friction stir weld head across the first region in a plurality of substantially parallel partially overlapping passes.

6. The method of claim 1, wherein said friction stirring in (b) creates a friction stir zone having a hardness value: (i) at least 10 points greater than the hardness of the second region on the Rockwell C hardness scale, (ii) at least 100 points greater than the hardness of the second region on the Vickers scale, or (iii) at least 100 points greater than the hardness of the second region on the Brinnel scale.

7. The method of claim 1, wherein said friction stirring in (b) creates a friction stir zone having a hardness value: (i) at least 20 points greater than the hardness of the second region on the Rockwell C hardness scale, (ii) at least 200 points greater than the hardness of the second region on the Vickers scale, or (iii) at least 200 points greater than the hardness of the second region on the Brinnel scale.

8. The method of claim 1, wherein said friction stirring in (b) creates a friction stir zone having a grain size of the first region less than one-half a grain size of the second region of the outer surface.

9. The method of claim 1, wherein said friction stirring in (b) creates a friction stir zone having a depth in a range from about 0.05 to about 0.25 inches.

10. The method of claim 1, wherein:
    (a) further comprises providing at least one particulate material on the first region of the outer surface; and
    (b) further comprises mixing the particulate material into the first region while friction stirring, thereby creating a reinforced friction stir zone including a particulate reinforcement.

11. The method of claim 10, wherein the particulate material includes at least one of an iron alloy powder, a carbide powder or fiber, a nitride powder or fiber, a superabrasive powder or fiber, and a diamond powder or fiber.

12. An underreamer for use in a downhole drilling assembly, the underreamer comprising:
    a tubular body configured for coupling with a drill string, the tubular body including an axial through bore and an outer surface including a first region that has been friction stirred and a second region, wherein the first region defines an opening for receiving an expandable and retractable cutting structure of the underreamer, the first region extending substantially the same as a length of the opening in the outer surface;
    wherein the at least one first region of the outer surface that has been friction stirred forms a friction stir zone having (i) a hardness greater than a hardness of the second region of the outer surface and (ii) a grain size of the first region less than one-half a grain size of the second region of the outer surface.

13. The underreamer of claim 12, wherein the friction stir zone has a hardness value: (i) at least 10 points greater than the hardness of the second region of the outer surface on the Rockwell C hardness scale, (ii) at least 100 points greater than the hardness of the second region of the outer surface on the Vickers scale, or (iii) at least 100 points greater than the hardness of the second region of the outer surface on the Brinnel scale.

14. The underreamer of claim 12, wherein the friction stir zone has a hardness value: (i) at least 20 points greater than the hardness of the second region of the outer surface on the Rockwell C hardness scale, (ii) at least 200 points greater than the hardness of the second region of the outer surface on the Vickers scale, or (iii) at least 200 points greater than the hardness of the second region of the outer surface on the Brinnel scale.

15. The underreamer00 of claim 12, wherein the friction stir zone has a depth in a range from about 0.05 to about 0.25 inches.

16. The underreamer00 of claim 12, wherein the friction stir zone includes at least one trough in cross-section, the trough having a depth in a range from about 0.05 to about 0.25 inches.

17. The underreamer00 of claim 12, wherein the friction stir zone comprises a reinforcing particulate material mixed therein, the particulate material including at least one of an iron alloy powder, a carbide powder or fiber, a nitride powder or fiber, a superabrasive powder or fiber, and a diamond powder or fiber.

* * * * *